(12) United States Patent
Van Campen

(10) Patent No.: US 8,408,722 B2
(45) Date of Patent: Apr. 2, 2013

(54) DISPLAY STAGE FOR DIFFUSELY ILLUMINATING ARTICLES

(76) Inventor: Berington Van Campen, Alhambra, CA (US)

( * ) Notice: Subject to any disclaimer, the term of this patent is extended or adjusted under 35 U.S.C. 154(b) by 188 days.

(21) Appl. No.: 12/971,867

(22) Filed: Dec. 17, 2010

(65) Prior Publication Data

US 2011/0317394 A1 Dec. 29, 2011

Related U.S. Application Data

(60) Provisional application No. 61/287,304, filed on Dec. 17, 2009.

(51) Int. Cl.
*G03B 15/06* (2006.01)

(52) U.S. Cl. ............ 362/16; 362/33; 362/355; 362/365; 396/1

(58) Field of Classification Search .............. 362/16–18, 362/33, 156, 355, 365; 396/1
See application file for complete search history.

(56) References Cited

U.S. PATENT DOCUMENTS

| | | | | |
|---|---|---|---|---|
| 384,151 | A * | 6/1888 | Gould | 396/4 |
| 3,643,085 | A * | 2/1972 | Durand | 396/4 |
| 3,967,301 | A * | 6/1976 | Corning | 396/3 |
| 4,255,045 | A * | 3/1981 | Eisenberg | 355/37 |
| 4,292,662 | A * | 9/1981 | Gasperini | 362/17 |
| 4,951,076 | A | 8/1990 | Baillie-Hamilton et al. | |
| 5,664,232 | A * | 9/1997 | Goto | 396/1 |
| 5,761,540 | A | 6/1998 | White | |
| 5,850,256 | A | 12/1998 | Corley | |
| 6,106,124 | A * | 8/2000 | Tarsia | 362/17 |
| 6,606,453 | B2 * | 8/2003 | Saigo et al. | 396/1 |
| 6,659,620 | B2 | 12/2003 | Goto | |
| 6,672,737 | B2 * | 1/2004 | Lai et al. | 362/16 |
| 7,055,976 | B2 * | 6/2006 | Blanford | 362/16 |
| 7,386,227 | B1 * | 6/2008 | Henderson | 396/4 |
| 7,396,148 | B1 * | 7/2008 | Tsai | 362/17 |
| 7,680,401 | B1 * | 3/2010 | Adelstein | 396/1 |

OTHER PUBLICATIONS

Excerpt from Brookstone catalog. "Photo-Lighting Studio." Date: Christmas Gift Guide 2008. 1 page.

* cited by examiner

*Primary Examiner* — Ismael Negron
(74) *Attorney, Agent, or Firm* — Jansson Shupe & Munger Ltd.

(57) ABSTRACT

The display stage includes a top and bottom compartments. The top compartment is defined by a translucent horizontal wall having a front end, and top and bottom surfaces extending rearwardly from the front end to a translucent backwall having front and rear surfaces. The bottom compartment is defined by an angular wall extending downwardly from the horizontal-wall front end and has a reflective surface facing the bottom surface of the horizontal wall. A light source behind the compartments provides illumination of an article disposed on the horizontal wall, by directing light at both at the rear surface of the backwall and the reflective surface of the angular wall.

20 Claims, 5 Drawing Sheets

DISPLAY STAGE FOR DIFFUSELY ILLUMINATING ARTICLES

RELATED APPLICATIONS

This application is based in part on U.S. Provisional Application No. 61/287,304, filed Dec. 17, 2009, the contents of which are incorporated herein by reference.

FIELD OF THE INVENTION

This invention pertains to lighting/staging devices for use in photography and, more specifically, to devices for diffused-light illumination of objects being photographed or displayed.

BACKGROUND OF THE INVENTION

Advantageous lighting of items for purposes of photography or display is a matter of great importance in a number of commercial and other fields. Items improperly illuminated are ascribed considerably less value than items advantageously illuminated. Because of this well-known fact, a significant investment is made in a wide variety of lighting and illumination devices.

While there have long been many diffused lighting or "soft light" devices, particularly those used in the fields of photography and television production, prior devices tend to be rather complex in having multiple parts and systems, tend to require a high level of expertise for proper and effective use, and/or often fall short of achieving the most advantageous lighting for whatever item is being photographed or displayed.

More specifically, many prior devices address the illumination of a subject on a relatively two-dimensional basis, usually from the front and sides of the subject to be photographed. "Soft," or diffused lighting can be created with various lighting instruments specifically designed to generate such light, or with instruments so equipped with any of a number of types of diffusion filters and/or employment of reflective surfaces as to illuminate the subject with a soft, relatively shadow-free light, or with enclosures housing the photographic subject, that either diffuse outside lighting through filtration, or reflect internally-mounted lighting within a white-colored chamber or tent.

Occasionally, it is incumbent upon a photographer or video lighting director to provide lighting from directly beneath a subject, and this is usually attained by placing the object on a self-contained "light table" or a larger translucent surface under which upward-aimed lighting instruments (usually referred to as "uplights") are placed, and the desired effect may be obtained. However, this is most often a bulky, complex and costly procedure requiring levels of lighting and construction expertise not found among many studio technicians or lighting directors.

A third staging and lighting technique often used is the use of a "coved background," in which the floor or display surface are joined smoothly with the vertical wall or background behind the subject by means of a curved transition surface, so no line, or "horizon" between them is visible. Many devices have also been built to address this seamless "infinity background." From tabletop-sized units to studio-length "coved" walls large enough for cars to be parked before them for display, they may be found with relative ease. These "coved" devices are all illuminated from the front, sides and above by lighting instruments placed near the angle of the camera ("key" lights), and at various locations around the subject so as to create fewer shadows, and/or minimize shadows created by other lamps. Every light used creates its own shadow to be corrected or hidden, and with more lighting instruments, there are more shadows, so creating such a display for photography or television can be a daunting task, again requiring equipment, space, experience and expertise.

When employing two or more of the above display and lighting techniques simultaneously, for example, while using a translucent up-lit staging surface beneath the photographic subject in conjunction with a front-illuminated coved background, it is difficult or impossible to achieve the smooth and effective combination necessary to create the desired "infinity effect." Any variables introduced create more complications, requiring yet more equipment and expertise.

There is prior art regarding to inventions which address one or more of these photographic scenarios, but usually addressing only one at a time, and in a format that allows little or no flexibility.

One of the closest-related references would be that of U.S. Pat. No. 3,643,085 (Durand). This device uses a coved, translucent display and background surfaces to minimize or eliminate an apparent "horizon line" between the horizontal and vertical surfaces. Most significantly, this appliance uses only fixed, internal lighting sources beneath and behind the display surface, of either florescent or incandescent types, with no means to vary the distance, brightness, focus, angles or even color of the background lighting, particularly in the original "preferred embodiment" of the device, which uses only florescent tubes as a light source.

In fact, in the Durand patent, the only suggestion for varying the color of the background is to affix colored paper to the display surface, behind the subject of the photograph. This would both require previously unneeded back-lighting, side-lighting instruments and filters to achieve the desired diffused-lighting effect thus lost by eliminating the light-box, as well as eliminate the ability to light from underneath—the original stated purpose of the device in the first place.

OBJECTS OF THE INVENTION

It is an object of this invention, to provide an improved article-display stage which overcomes certain problems and shortcoming of the prior art including those referred to above.

Another object of the invention is to provide an improved article-display stage which is of a simple construction and is easy to use.

Yet another object of the invention is to provide an improved article-display stage which allows illumination of an article to be photographed with a soft, relatively shadow-free lighting.

Another of the invention is to provide an improved article-display stage providing variability in the light patterns and balances created, with a minimum number of lighting instruments—as few as one or two—and a minimum of setup and adjustment time for a wide range of effects used.

Another object of the invention is to provide an improved article-display stage with flexibility for creating multi-hued surfaces for display of the article.

These and other objects of the invention will be apparent from the following descriptions and the drawings.

SUMMARY OF THE INVENTION

The present invention is constructed of rigid, translucent-white Plexiglass or other plastic material such as acrylic, which integrally provides the physical support for the similarly-constructed article-staging surface and the article thereon to be photographed, and also provides the means to diffuse and control the illumination of the article by external lighting sources. It includes a built-in curved, or "coved" transition surface between the horizontal display and the vertical background planes. Such coved transition assures not only a "seamless" effect, in which no "horizon line" is visible in the photo image, but also effortlessly creates a completely smooth gradient in any lighting variances between the vertical and horizontal surfaces. Such variances may include such aspects of luminance as color, focus, brightness and angle of light transmission, most significantly obvious between two or more colors. The present invention also solves the problems of soft-lighting and shadows by using as few as two (in some cases perhaps only one) external lighting instruments, of a steady, non-strobing "flood" or "spotlight" type. One such lighting instruments is located behind the unit and aimed at a combination of elements which collect, diffuse, split and redirect said rear light so as to create the effect of two or more lighting instruments with only one. The present invention effectively eliminates shadows and even creates multi-hued surfaces with startling purity of color and smoothness of transition between the horizontal and vertical planes.

In the present invention, the illumination of a photographic subject is provided by common external lighting instruments typically found within a photography or video studio. In such lighting instruments, focus, distance, brightness, angle and all other variables are easily and quickly changed. Further, with commonly-used colored filters such lighting instruments will provide an infinite number of hues available for both background and/or display surfaces. Such filters may be of the type made of gelatine or similar filters. It is the novel means of utilizing and dispersing this external lighting that makes the present invention new and completely unique in the field of staging for photography, video and product display purposes.

The present invention is highly useful for still photography, television production, or live display purposes, and the means by which light is diffused and distributed between vertical background and horizontal display planes, and made variable in all aspects of luminance (brightness), color, focus, and angle of light transmission. Additionally, this invention pertains to specific staging devices with which "seamless" backgrounds are created, thus eliminating "horizon lines" behind the photographed subject.

The present invention is an article-display stage of the type including a horizontal article-surface for display of an article thereon, a backwall, and means to illuminate the article. The inventive article-display stage includes a top and bottom compartments. The top compartment includes a translucent horizontal wall having a front end, the article-support surface and a bottom surface extending rearwardly from the front end to the backwall. The backwall is translucent and has front and rear surfaces. The bottom compartment includes an angular wall that extends downwardly from the horizontal-wall front end and has a reflective surface facing the bottom surface of the horizontal wall. A light source behind the compartments provides dual back-and-bottom illumination of the article by directing light both at the rear surface for diffused back-light illumination through the backwall and at the reflective surface for diffused reflected up-light illumination through the horizontal wall. The angular wall preferably extends at about forty-five degrees with respect to the bottom surface of the horizontal wall.

It is preferred that the light source is separate from the compartments and may be an adjustable professional lighting fixture which provides appropriate focusing, shuttering and filter mounts for various back-light and up-light effects.

In alternative embodiments, the light source may be in the form of an LED light board positioned behind the inventive article-display stage at a distance for illumination of the vertical backwall and the angular wall. The LED light board may be slidably secured with respect to the top and bottom compartments.

The inventive article-display stage may further include a similar front-illumination light source.

In preferred embodiments, the article-support surface of the horizontal wall smoothly transitions into the front surface of the backwall. The transition is preferably a portion of a substantially cylindrical surface having a radius of curvature in excess of about three centimeters. It is preferred that the radius of curvature is in excess of about six centimeters.

The inventive article-display stage preferably includes a pair of sidewalls with substantially white inward surfaces each extending along one side of each of the horizontal, back and angular walls to provide side illumination by reflecting light received on the inward surfaces. It is preferred that the portions of the sidewalls above the horizontal surface are translucent.

In some alternative embodiments, all surfaces facing the article to be photographed preferably have a non-shiny finish such that these surfaces are not completely smooth and do not produce unwanted reflected images. Examples of such non-shiny finishes are "mat," "sandblasted," "frosted" or other similar type finishes. It is also preferred that all surfaces of the translucent walls, including surfaces outside of the interior of the article-display stage, be non-shiny, thus, minimizing any exterior reflective images which may affect the quality of the photographed image.

In some embodiments, the light source includes a color filter for color illumination to the back and bottom of the article. The color filter may be over only a portion of the light source to provide a dual-color illumination. In such embodiments, the color filter may be over a portion of the light source that primarily directs light at one of the rear surface of the backwall and the reflective surface, while an uncovered portion of the light source primarily directs light at the other of the rear surface of the backwall and the reflective surface.

Alternatively, the light source includes a plurality of color filters for multicolor illumination. Separate color filters preferably cover separate portions of the light source to provide a dual-color illumination. One of the color filters is preferably over a portion of the light source that primarily directs light at one of the rear surfaces of the backwall and the reflective surface, while another of the color filters preferably primarily directs unfiltered light at the other of the rear surface of the backwall and the reflective surface.

In preferred embodiments of the present invention, the article-display stage is a light, portable table-top unit, comprised of a vertical square column, built almost wholly of neutrally white, matt-finished, translucent plastic or Plexiglas, equal or near-equal in both width and depth, open at the top and front, and divided into two equal compartments, upper and lower.

The upper compartment preferably consists of a horizontal staging surface for placement of a photographic subject. The upper compartment is open in the front (camera side) to allow unimpeded frontal (key) lighting and visual camera access to the subject. The vertical background surface is preferably at 90° to the horizontal surface with the coved or smoothly-curved transition between the two surfaces. The vertical background surfaces and horizontal surfaces are preferably made of a single piece of formed Plexiglas. These walls, including the two side walls, are all used for both collection and reflection of light used for illumination of the subject to be photographed. The side walls are the full height of the entire unit, doubling as both light collectors, reflectors and diffusers, and as the core support structures for all other parts contained therein.

In some embodiments, the lower compartment is approximately equal in size and volume to the upper compartment. The lower compartment preferably includes an attached lower front panel and contains a reflective mirror which is facing the rear of the unit. The mirror is preferably mounted at a forty-five degree angle to the horizontal display surface above it. The mirror is a key to distributing a predetermined and controllable portion of the backlight from behind the inventive staging booth by aiming the light upwards through the display surface as an "uplight" just as effectively as if a true lighting instrument were mounted beneath that surface. The rear of the inventive unit is open to expose the mirror to the backlight, thus collecting that light, or a given portion of it, and reflecting it upward as described, at and through the translucent display surface.

The light sources used in the present invention may be of the type well-known in the photographic and television arts. Preferably, the light sources are professional lighting instruments equipped with focusable fresnel lenses and top and side light-control shutters commonly known as "barndoors" affixed to the front accessory/filter clips. The preferred wattage of the lamps used will vary depending on the brightness or amount of illumination desired for a particular photographic session.

In use, one lamp is normally placed near the camera location as the primary frontal illumination of the object, known as the "key light," and is used much as in any typical lighting arrangement. The focus or width of the key light's illumination, and balance of luminance between the key light and backlight, will vary the effects created by the inventive staging booth. One of the main features of the inventive booth is an almost infinite variability in the light patterns and balances created, with a minimum number of lighting instruments—as few as one or two—and a minimum of setup and adjustment time for a wide range of effects. The second lamp, the "backlight," is preferably placed at a slight distance behind the inventive unit, preferably on an adjustable stand, by which height, distance and angle of the light may be easily varied, according to the visual effects desired.

In this arrangement, the display surface and the background surface may be illuminated similarly by the backlight, for example with white light only, creating a seamless, "infinite" background for the subject. With only a slight adjustment in height or angle of the backlight, or adjustment of the "barndoors," one may easily illuminate only the vertical background, only the underside of the display surface, or any ratio of varying luminance between the two.

With the use of a colored "gel" filter on the backlight, the background and display surfaces will take on an entirely different look, still retaining the richness and luminance of pure color from both beneath and behind the subject. Such effects are unattainable with the use of opaque surfaces and backgrounds of paper or fabric, or painted surfaces.

Still other effects can be obtained by adjusting the focus of the backlight and the position of the filter to cover only half of the lamp face, for example. In this way, one can divide the use of only the one lighting instrument and choose to color the illumination of either the background or the display surface, while allowing the unfiltered white light to remain on the surface not colored as such. In a further variation of this concept, a second gel filter of a different color may be attached to the unfiltered portion of the lampface, thus providing two colors to illuminate the vertical background and subject display surfaces independently and uniquely.

Some embodiments may include all above features, but with a hinged construction so as to allow easy removal of the reflective mirror, and subsequent folding of the sides of the lower compartment, to allow increased portability.

Other alternative embodiments of the inventive staging booth have all features as described above, but with increased width or height, to accommodate photography of large subjects. There are no limitations to such dimensions, except whatever limitations there may be in the size of the Plexiglas elements used to construct the inventive booth.

In some other alternative embodiments, in addition to all features already described, the inventive booth may have an increased height and a second "coved" transition at the top, equal to the cove at the bottom, leading to a top horizontal surface parallel to the display surface. This may then be illuminated with a second backlight fixture, optionally with a third or fourth color combination, to allow photography aiming upward without losing the benefit of the interior surfaces of the booth. Such embodiments greatly expand the angles with which any subject may be photographed.

DETAILED DESCRIPTION OF PREFERRED EMBODIMENTS

Figure 1:
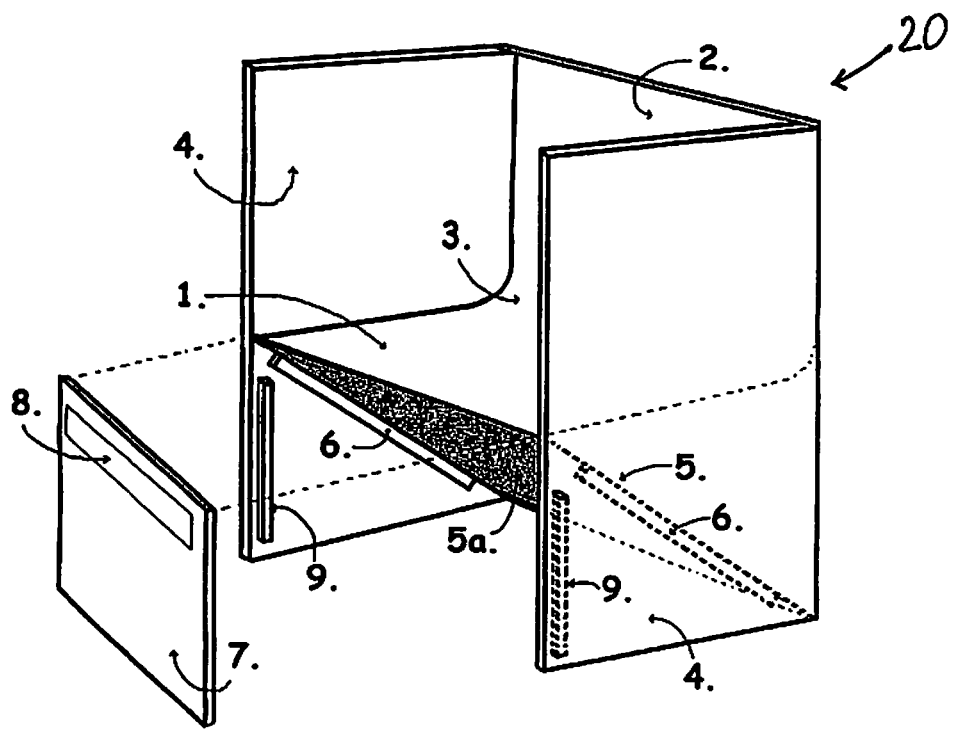
FIG. 1 is a perspective view of one embodiment of the inventive article-display stage shown with a front panel shown removed.

The FIGURES illustrate the improvement in an article-display stage 20 of the type including a horizontal article-surface 1 for display of an article thereon, a backwall 2, and light source 22 to illuminate the article. Inventive article-display stage 20 includes a top compartment 23 and bottom compartment 24. Top compartment 23 includes a translucent horizontal wall 12 having a front end 25, horizontal article surface 1 and a bottom surface 26 extending rearwardly from front end 25 to backwall 2. Backwall 2 is translucent and has front surface 27 and rear surface 28. Bottom compartment 24 includes an angular wall 29 that extends downwardly from horizontal-wall front end 25 and has a reflective surface 5 facing bottom surface 26 of horizontal wall 12. Light source 22 behind the compartments provides dual back-and-bottom illumination of the article by directing light both at rear surface 28 for diffused back-light illumination through backwall 2 and at reflective surface 5 for diffused reflected up-light illumination through horizontal wall 12. Angular wall 29 preferably extends at about forty-five degrees with respect to bottom surface 26 of horizontal wall 12.

Figure 2:
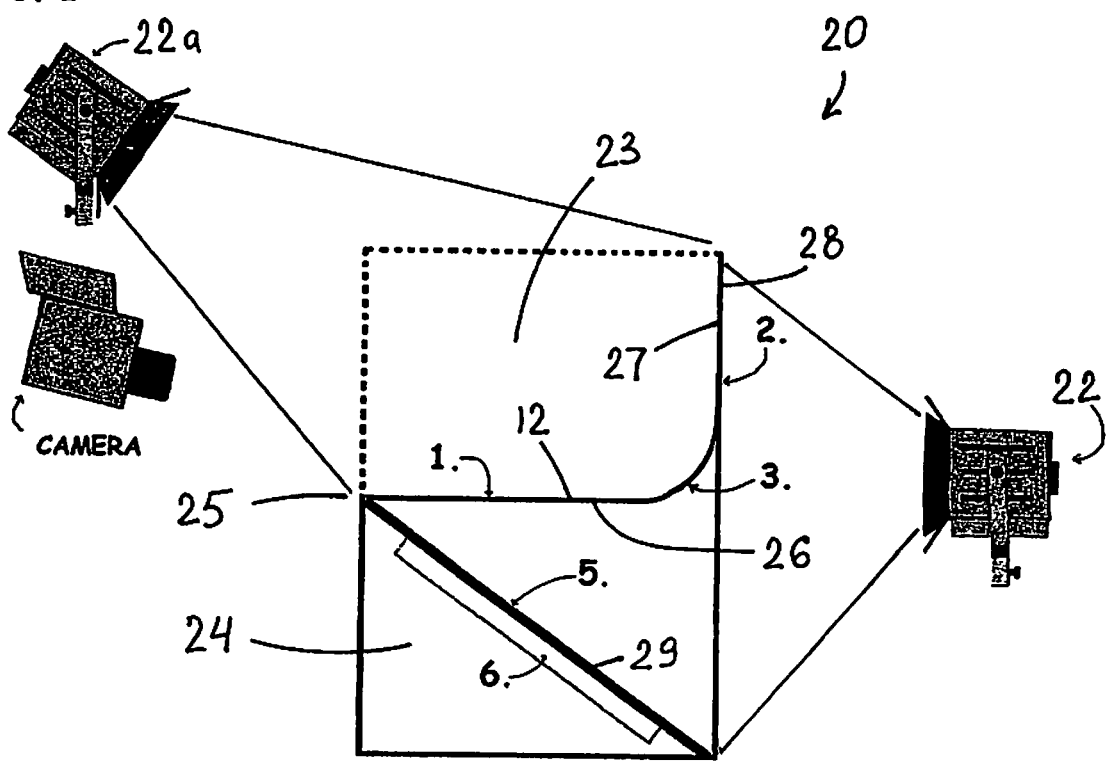
FIG. 2 is a cross-sectional side view of the article-display stage of FIG. 1 with a single-color illumination.
Figure 3:
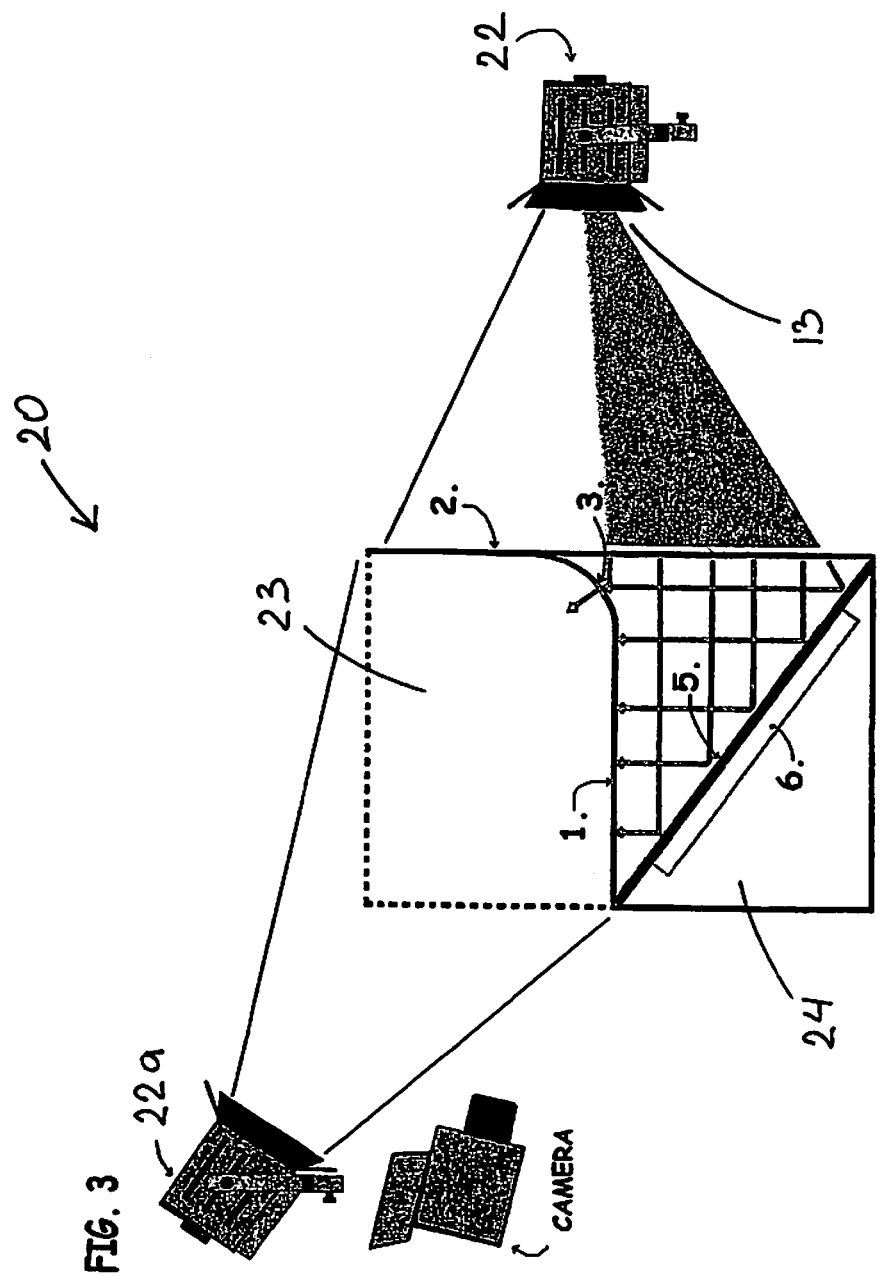
FIG. 3 is a cross-sectional side view of the article-display stage of FIG. 1 with a dual-color illumination.
Figure 4:
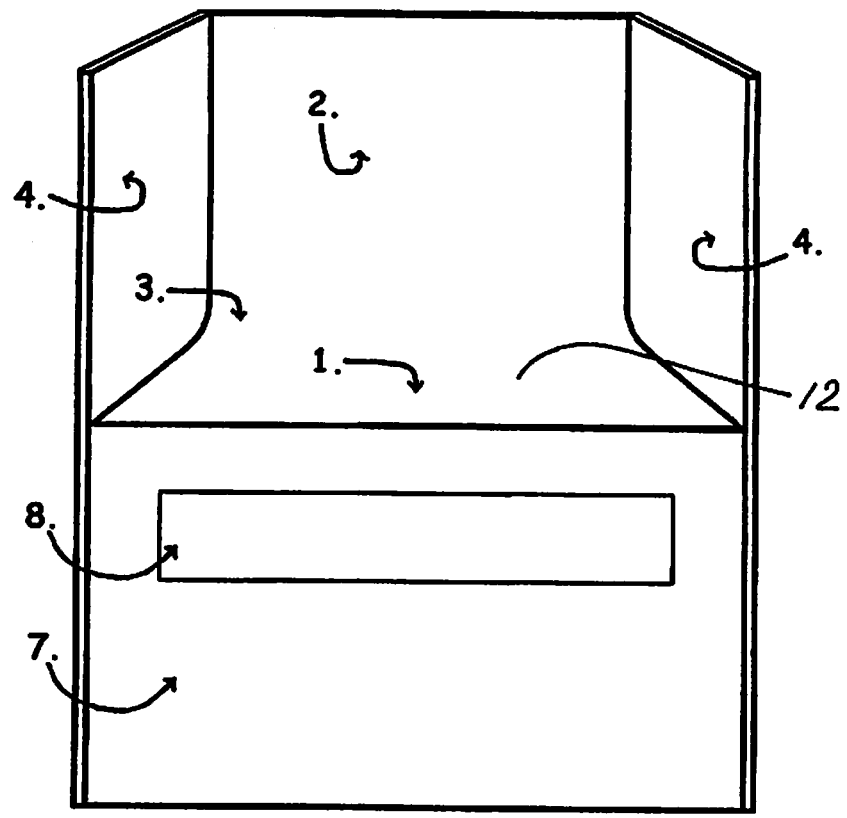
FIG. 4 is a front view of the article-display stage of FIG. 1 shown with the front panel in place.

As best seen in FIGS. 2 and 3, light source 22 is separate from compartments 23 and 24. These FIGURES show light source 22 as an adjustable professional lighting fixture which provides appropriate focusing, shuttering and filter mounts for various back-light and up-light effects.

FIGS. 2 and 3 further show that article-display stage 20 further includes a similar front-illumination light source 22a.

It is also seen in the FIGURES that article-support surface 1 of horizontal wall 12 smoothly transitions into front surface 27 of backwall 2. As best seen in FIGS. 2 and 3, smoothly-curve transition 3 is a portion of a substantially cylindrical surface. Smoothly-curve transition 3 preferably has a radius of curvature in excess of about three centimeters. It is preferred that the radius of curvature is in excess of about six centimeters.

As further seen in FIGS. 1 and 4-7, article-display stage 20 also includes a pair of sidewalls 4 with substantially white inward surfaces each extending along one side of each of the horizontal, back and angular walls 12, 2 and 29, respectively, to provide side illumination by reflecting light received on the inward surfaces. While able to reflect received light, the inward surfaces preferably have a non-shiny finish minimizing any unwanted reflected images which may decrease desired quality of photographed images of the article.

FIG. 3 shows that light source 22 includes a color filter 13 for color illumination to the back and bottom of the article. As further seen in FIG. 3, color filter 13 may be over only a portion of light source 22 to provide a dual-color illumination. Color filter 13 is shown to be over a portion of the light source that primarily directs colored light at reflective surface 5, while an uncovered portion of light source 22 primarily directs light at rear surface 28 of the backwall 2.

FIGS. 1-5 show article-display stage as a light, portable table-top unit, comprised of a vertical square column, built almost wholly of neutrally white, matt-finished, translucent plastic or Plexiglas, equal or near-equal in both width and depth, open at the top and front, and divided into two equal compartments, upper and lower.

Vertical backwall 2 with the background surface is preferably at 90° to the horizontal surface with the coved or smoothly-curved transition 3 between the two surfaces. As best seen in FIGS. 2-5, vertical backwall 2 and horizontal wall 12 can be made of a single piece of formed Plexiglas. Backwall 2 and horizontal wall 12 as well as two side walls 4, are all used for both collection and reflection of light used for illumination of the subject to be photographed. It is seen in all FIGURES that side walls 4 are the full height of the entire article-display unit 20, doubling as both light collectors, reflectors and diffusers, and as the core support structures for all other parts contained therein.

In embodiments shown in FIGS. 1-5, bottom compartment 24 is approximately equal in size and volume to top compartment 23. Bottom compartment 24 includes an attached lower front panel 7 and contains reflective surface 5 in the form of a mirror. Front panel 7 may include a logo/name plate for displaying the name of the photo studio or changeable mane of the project. Front panel may be secured by either gluing or with appropriate fasteners to sidewalls 4 with front-panel supports 9 mounted along front edge of each bottom-compartment portion of each sidewall 4.

Figure 5:
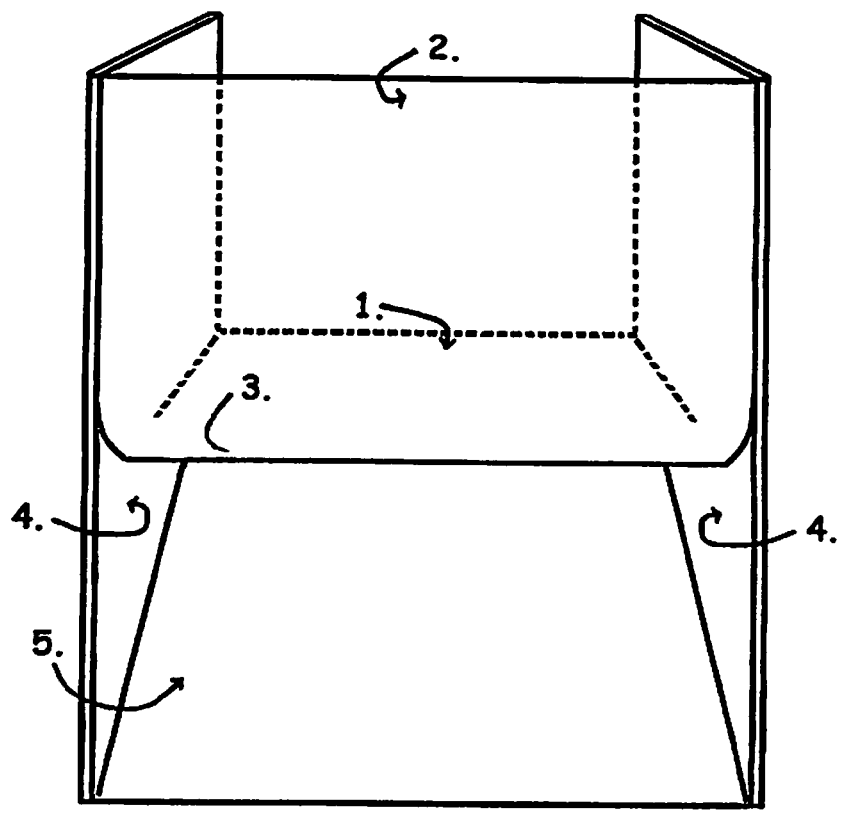
FIG. 5 is a rear view of the article-display stage of FIG. 1.

It is best seen in FIGS. 2 and 3 that mirror 5 is mounted at a forty-five degree angle to horizontal article-surface 1 above it. Mirror 5 may be secured with mirror supports 6 mounded at inward surfaces of each sidewall 4 in bottom compartment 24. Mirror 5 is a key to distributing a predetermined and controllable portion of the backlight from behind article-display stage by aiming the light upwards through horizontal article-surface 1 as an "uplight" just as effectively as if a true lighting instrument were mounted beneath that surface. FIG. 5 best shows that the rear of article-display stage unit 20 is open to expose mirror 5 to the backlight, thus collecting that light, or a given portion of it, and reflecting it upward, as described, at and through translucent horizontal article-surface 1.

FIGS. 2 and 3 show that in use, front-illumination light source 22a is normally placed near the camera location as the primary frontal illumination of the object, known as the "key light," and is used much as in any typical lighting arrangement. The focus or width of the key light's illumination, and balance of luminance between the key light and backlight, will vary the effects created by the inventive staging booth. Second lamp of light source 22, the "backlight," is placed at a slight distance behind article-display stage 20. In such arrangement, distance and angle of light source 22 may be easily varied, according to the visual effects desired.

Figure 6:
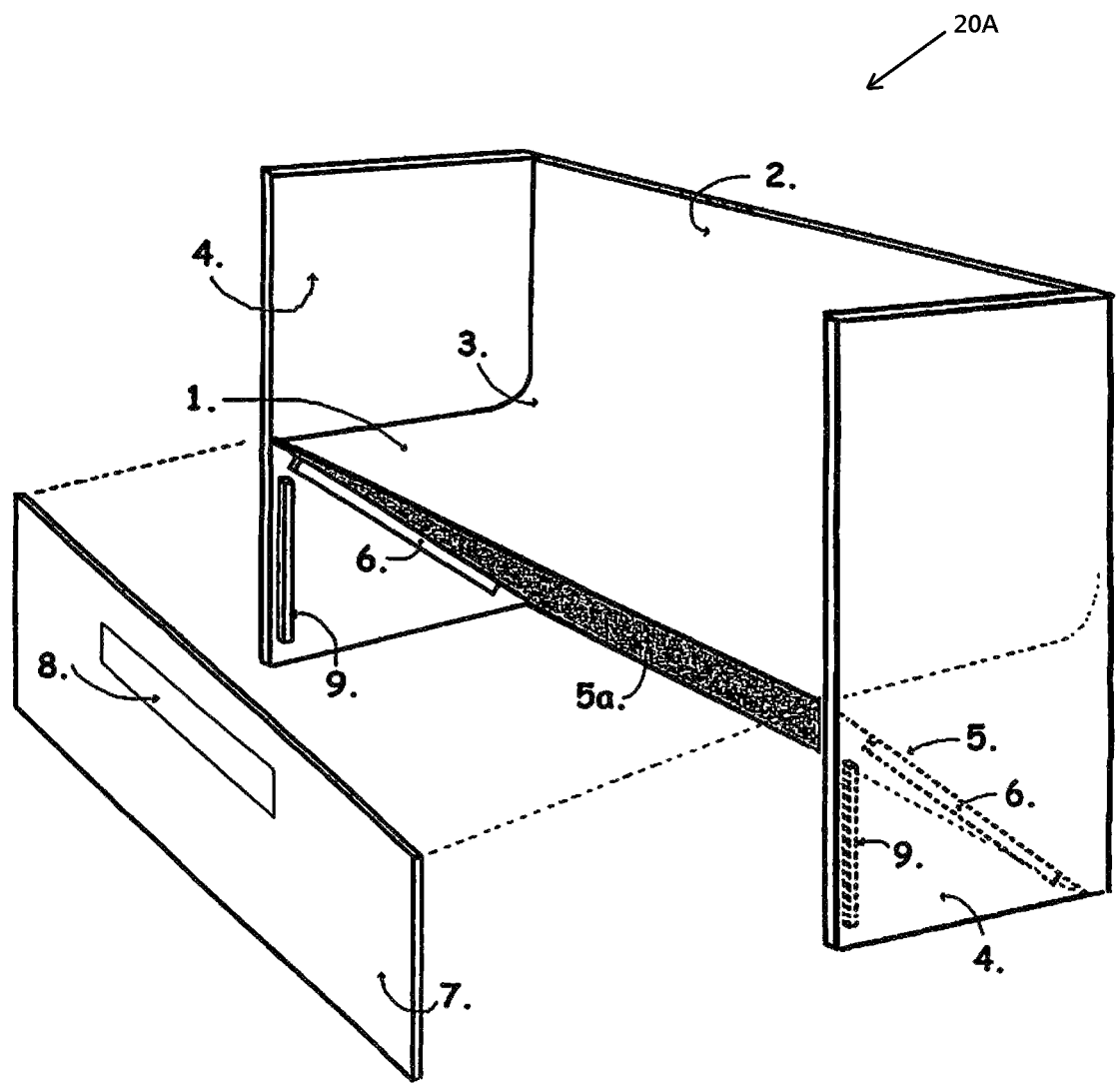
FIG. 6 is a perspective view of another embodiment of the inventive article-display stage shown with the front panel removed.
Figure 7:
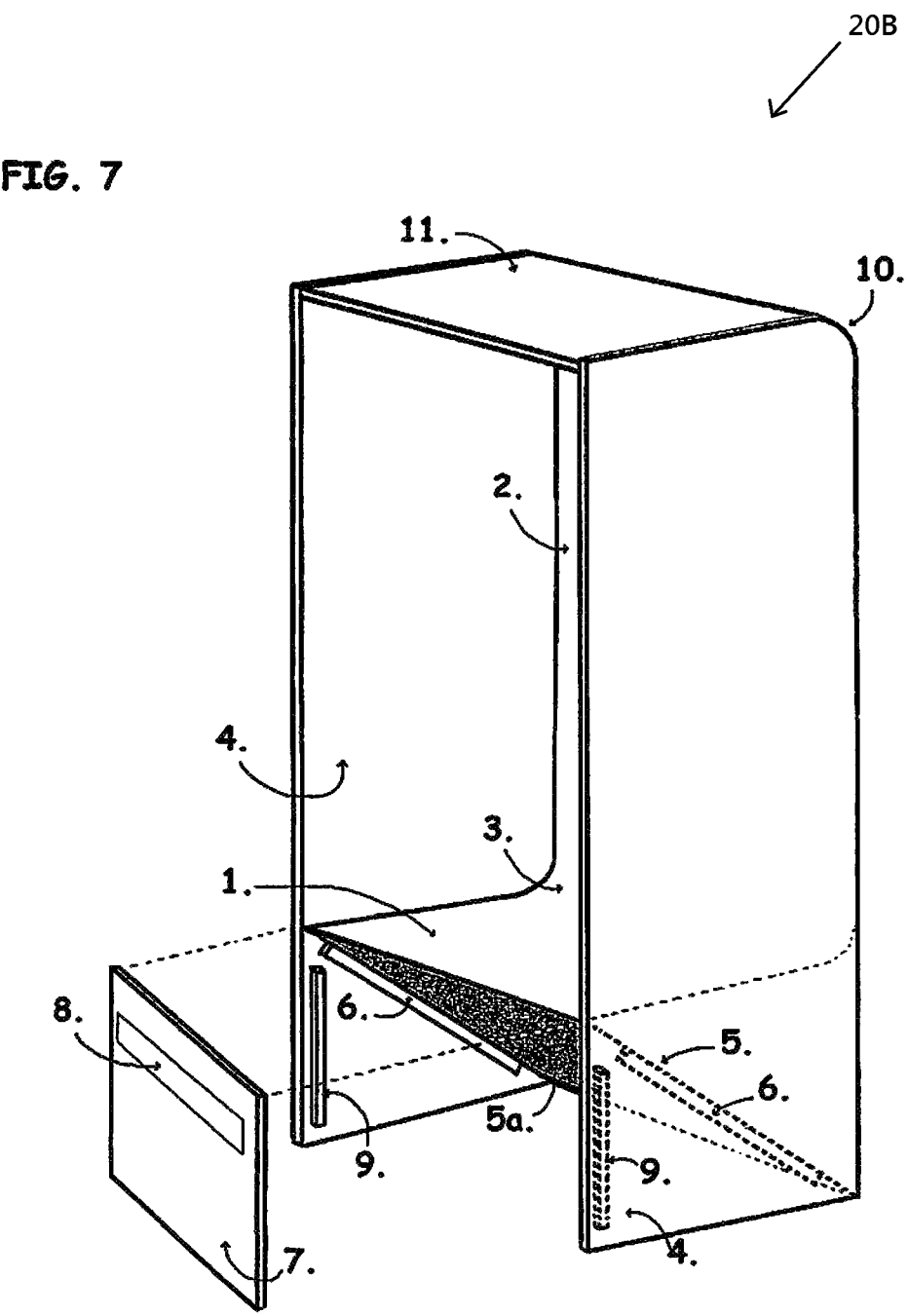
FIG. 7 is a perspective view of yet another embodiment of the inventive article-display stage shown with the front panel removed.

FIGS. 6 and 7 illustrate alternative embodiments of article-display stage 20A and 20B which have all features as described above. Stage 20A, as shown in FIG. 6, has increased width. And stage 20B, as shown in FIG. 7, has increased height. Both versions are useful to accommodate photography of large subjects. There are no limitations to such dimensions.

FIG. 7 further illustrates that, in addition to all features already described, stage 20B has an increased height and a second "coved" transition 10 at the top of stage 20B. The second "coved" transition 10 is equal to coved transition 3 at the bottom, leading to a top horizontal surface 11 parallel to display surface 1. This may then be illuminated with a second backlight fixture, optionally with a third or fourth color combination, to allow photography aiming upward without losing the benefit of the interior surfaces of stage 20. Such embodiments greatly expand the angles with which any subject may be photographed.

While the principles of the invention have been shown and described in connection with specific embodiments, it is to be understood that such embodiments are by way of example and are not limiting.

The invention claimed is:

1. An article-display stage comprising:
    a top compartment including (a) a translucent horizontal wall having a front end, an article-support surface and a bottom surface, and (b) a translucent backwall having front and rear surfaces, the horizontal wall extending rearwardly from the front end to the backwall;
    a bottom compartment including an angular wall extending downwardly from the front end of the horizontal wall, the angular wall having a reflective surface facing the bottom surface of the horizontal wall; and
    a light source behind the top and bottom compartments and providing dual back-and-bottom illumination of an article disposed on the article-support surface by directing light at both the rear surface for diffused back-light illumination through the backwall and at the reflective surface for diffused reflected up-light illumination through the horizontal wall.

2. The apparatus of claim 1 further including a pair of sidewalls with substantially white inward surfaces each extending along one side of the horizontal, back and angular walls to provide side illumination by reflecting light received on the inward surfaces.

3. The apparatus of claim 2 wherein the portions of the sidewalls above the horizontal surface are translucent.

4. The apparatus of claim 2 wherein the article-support surface, the backwall front surface and the inward surfaces of the sidewalls have a non-shiny finish minimizing unwanted reflected images.

5. The apparatus of claim 1 wherein the article-support surface of the horizontal wall smoothly transitions into the front surface of the backwall.

6. The apparatus of claim 5 wherein the transition is a portion of a substantially cylindrical surface having a radius of curvature in excess of about three centimeters.

7. The apparatus of claim 5 wherein the radius of curvature is in excess of about six centimeters.

8. The apparatus of claim 5 wherein the single light source is an adjustable lighting fixture providing various back-light and up-light effects.

9. The apparatus of claim 5 wherein the angular wall extends at about forty-five degrees with respect to the bottom surface of the horizontal wall.

10. The apparatus of claim 5 further including a pair of sidewalls with substantially white inward surfaces each extending along one side of each of the horizontal, back and angular walls to provide side illumination by reflecting light received on the inward surfaces.

11. The apparatus of claim 10 wherein the portions of the sidewalls above the horizontal surface are translucent.

12. The apparatus of claim 10 wherein the article-support surface, the backwall front surface and the inward surfaces of the sidewalls have a non-shiny finish minimizing unwanted reflected images.

13. The apparatus of claim 5 wherein the light source includes a color filter for color illumination to the back and bottom of the article.

14. The apparatus of claim 13 wherein the light source is an adjustable lighting fixture providing various back-light and up-light effects.

15. The apparatus of claim 13 wherein the color filter is only over a portion of the light source to provide a dual-color illumination.

16. The apparatus of claim 15 wherein the color filter is over a portion of the light source that primarily directs light at one of the rear surface of the backwall and the reflective surface, while an uncovered portion of the light source primarily directs light at the other of the rear surface of the backwall and the reflective surface.

17. The apparatus of claim 13 wherein the light source includes a plurality of color filters for multicolor illumination.

18. The apparatus of claim 17 wherein separate color filters cover separate portions of the light source to provide a dual-color illumination.

19. The apparatus of claim 18 wherein one of the color filters is over a portion of the light source that primarily directs light at one of the rear surface of the backwall and the reflective surface, while another of the color filters primarily directs light at the other of the rear surface of the backwall and the reflective surface.

20. In an article-display stage of the type including a horizontal article-support surface for display of an article thereon, a backwall, and means to illuminate the article, the improvement comprising:

a top compartment including a translucent horizontal wall having a front end, the article-support surface and a bottom surface extending rearwardly from the front end to the backwall which is translucent and has front and rear surfaces; and a bottom compartment including an angular wall that extends downwardly from the horizontal-wall front end and has a reflective surface facing the bottom surface of the horizontal wall, thereby to provide dual back-and-bottom illumination of the article from a light source behind the compartments directing light both at the rear surface for diffused back-light illumination through the backwall and at the reflective surface for diffused reflected up-light illumination through the horizontal wall.

* * * * *